United States Patent
Ewald et al.

(10) Patent No.: US 8,661,969 B2
(45) Date of Patent: Mar. 4, 2014

(54) SHELLED EGG STAGING DEVICE, METHOD OF STORING SHELLED EGGS AND METHOD OF COOKING SHELLED EGGS

(75) Inventors: Henry Ewald, Roselle, IL (US); Craig Conley, Oswego, IL (US); Thomas Tapper, Schenectady, NY (US)

(73) Assignee: Restaurant Technology, Inc., Oak Brook, IL (US)

( * ) Notice: Subject to any disclaimer, the term of this patent is extended or adjusted under 35 U.S.C. 154(b) by 1590 days.

(21) Appl. No.: 11/390,523

(22) Filed: Mar. 27, 2006

(65) Prior Publication Data

US 2007/0224333 A1 Sep. 27, 2007

(51) Int. Cl.
*A22C 7/00* (2006.01)
*B65G 7/12* (2006.01)

(52) U.S. Cl.
USPC ............. 99/426; 99/324; 99/380; 99/383; 99/384; 99/407; 99/416; 99/359; 99/372; 99/382; 99/440; 294/26.5

(58) Field of Classification Search
CPC ............ A23L 1/32; A47J 43/20; A47J 47/01; A47J 29/06; A47J 37/108
USPC ........... 99/426, 440, 448, 324, 383, 427, 407, 99/416, 359, 372, 380, 384, 382; 206/205, 206/484, 521.1–521.9, 820; 229/117.24, 229/120.09, 927; 220/23.4, 4.25; 249/105, 249/141, 120, 160, 55; 426/241, 243, 107, 426/113, 299, 665, 115, 87, 300, 523, 614; D7/503, 611, 672; D9/757, 762, 758, D9/456; D15/90; 294/26.5
IPC ....................................................... A23L 1/32
See application file for complete search history.

(56) References Cited

U.S. PATENT DOCUMENTS

| 284,608 | A | * | 9/1883 | Campbell | 99/407 |
|---|---|---|---|---|---|
| 323,887 | A | * | 8/1885 | Rutter | 249/119 |
| 774,586 | A | * | 11/1904 | Judka | 99/377 |
| 781,081 | A | * | 1/1905 | MacFate | 222/129 |
| 864,369 | A | * | 8/1907 | Graham | 294/26.5 |
| 869,690 | A | * | 10/1907 | Brown | 294/26.5 |
| 1,170,922 | A | * | 2/1916 | Maguire | 294/26.5 |
| 1,285,709 | A | * | 11/1918 | Hossick | 294/26.5 |
| 1,292,476 | A | * | 1/1919 | Kavanagh | 220/4.22 |
| 1,390,772 | A | * | 9/1921 | Fontaine et al. | 294/26.5 |
| 1,462,105 | A | * | 7/1923 | Hart | 99/407 |

(Continued)

OTHER PUBLICATIONS

European Patent Office, Extended European Search Report, European Patent Application No. 07752683.8, Mar. 2, 2009.

(Continued)

*Primary Examiner* — Henry Yuen
*Assistant Examiner* — Brett Spurlock
(74) *Attorney, Agent, or Firm* — Hinshaw & Culbertson LLP

(57) ABSTRACT

A food staging device particularly suited for shelled eggs, a method of storing shelled eggs, and a method of cooking shelled eggs are provided. The shelled egg staging device comprises an elongated body, individual receiving receptacles, a pour spout associated with each receiving receptacle, and a handle. The food staging device can be used to hold shelled eggs prior to cooking, for example. A method of storing shelled eggs in a shelled egg staging device is provided. A method of cooking the shelled eggs is provided and comprises containing shelled eggs in a food staging device and pouring the shelled eggs onto a cooking surface.

12 Claims, 6 Drawing Sheets

(56) References Cited

U.S. PATENT DOCUMENTS

| | | | | |
|---|---|---|---|---|
| 1,469,318 A | | 10/1923 | Hill | |
| 1,507,133 A | * | 9/1924 | Loeble | 220/508 |
| 1,528,231 A | * | 3/1925 | Woodson | 294/26.5 |
| 1,759,398 A | * | 5/1930 | Hart | 211/14 |
| 1,900,761 A | * | 3/1933 | Proteau | 294/26.5 |
| 1,957,133 A | * | 5/1934 | Davis | 99/424 |
| 1,958,502 A | * | 5/1934 | Volpin | 62/300 |
| 2,268,457 A | * | 12/1941 | Moore | 396/643 |
| 2,464,307 A | * | 3/1949 | Griffin et al. | 99/440 |
| 2,824,510 A | * | 2/1958 | Gangwer | 99/423 |
| 2,858,224 A | * | 10/1958 | Darrah | 206/521.1 |
| 3,161,156 A | * | 12/1964 | Batista et al. | 249/120 |
| 3,713,528 A | * | 1/1973 | Daenen et al. | 206/525 |
| D228,219 S | * | 8/1973 | Snyder | D7/503 |
| 3,942,427 A | | 3/1976 | Vaca | |
| 4,015,704 A | | 4/1977 | Warren | |
| 4,057,188 A | * | 11/1977 | Steinhardt | 206/521.8 |
| 4,261,693 A | * | 4/1981 | Rayner et al. | 425/431 |
| 4,280,032 A | * | 7/1981 | Levinson | 219/729 |
| 4,345,516 A | * | 8/1982 | Sinclair | 99/426 |
| 4,352,324 A | * | 10/1982 | Noh | 99/425 |
| 4,394,214 A | * | 7/1983 | Bixler et al. | 162/228 |
| 4,409,249 A | | 10/1983 | Forkner | |
| 4,483,240 A | * | 11/1984 | Dinh | 99/407 |
| 4,488,479 A | | 12/1984 | Sloan et al. | |
| 4,512,250 A | | 4/1985 | Schindler et al. | |
| 4,522,117 A | | 6/1985 | Weimer et al. | |
| 4,553,692 A | * | 11/1985 | Padovani | 206/521.1 |
| 4,607,569 A | * | 8/1986 | Murphy | 99/426 |
| 4,656,928 A | * | 4/1987 | Mack | 99/419 |
| 4,665,813 A | | 5/1987 | Maisonneuve | |
| 4,681,027 A | * | 7/1987 | Meamber | 99/422 |
| 4,798,133 A | * | 1/1989 | Johnson | 99/440 |
| 4,842,143 A | * | 6/1989 | McKee et al. | 206/521.1 |
| 4,853,509 A | * | 8/1989 | Murakami | 219/731 |
| 4,862,790 A | | 9/1989 | Platteschorre et al. | |
| 4,908,487 A | * | 3/1990 | Sarnoff et al. | 219/735 |
| 4,930,409 A | * | 6/1990 | Stefanakis | 99/484 |
| 5,088,392 A | * | 2/1992 | Ancona et al. | 99/499 |
| 5,230,156 A | * | 7/1993 | Patenaude | 30/325 |
| 5,278,376 A | * | 1/1994 | Cyr | 219/734 |
| D352,206 S | * | 11/1994 | Davis | D7/357 |
| 5,377,583 A | | 1/1995 | Tomosue | |
| 5,413,231 A | * | 5/1995 | Carroll et al. | 215/396 |
| D363,636 S | * | 10/1995 | Leung | D7/357 |
| 5,645,169 A | * | 7/1997 | Dull et al. | 206/589 |
| D404,642 S | * | 1/1999 | Major | D9/757 |
| 6,095,038 A | | 8/2000 | Cerro | |
| 6,196,426 B1 | * | 3/2001 | White | 222/572 |
| 6,508,166 B1 | * | 1/2003 | Hennessey | 99/355 |
| 6,620,449 B1 | | 9/2003 | Peers | |
| 6,753,030 B2 | * | 6/2004 | Reed | 426/505 |
| 6,813,994 B2 | * | 11/2004 | Williams | 99/426 |
| 6,990,893 B2 | * | 1/2006 | Cheng | 99/422 |
| D555,419 S | * | 11/2007 | Reckert et al. | D7/361 |
| D558,531 S | * | 1/2008 | Ewald et al. | D7/611 |
| 2004/0060457 A1 | * | 4/2004 | Williams | 99/422 |
| 2005/0045046 A1 | * | 3/2005 | Cheng | 99/422 |
| 2005/0056666 A1 | | 3/2005 | Erlandsen | |
| 2005/0081385 A1 | * | 4/2005 | Ho | 30/123 |
| 2005/0136172 A1 | | 6/2005 | Hairsine et al. | |
| 2009/0255413 A1 | * | 10/2009 | Ewald et al. | 99/426 |

OTHER PUBLICATIONS

International Searching Authority, International Search Report and Written Opinion, International Application No. PCT/US07/06000, Jul. 7, 2008.

* cited by examiner

SHELLED EGG STAGING DEVICE, METHOD OF STORING SHELLED EGGS AND METHOD OF COOKING SHELLED EGGS

FIELD OF THE INVENTION

The present invention relates to a shelled egg staging device. It also relates to a method of storing shelled eggs and a method of cooking shelled eggs.

BACKGROUND OF THE INVENTION

Many restaurants must prepare a high volume of food relatively quickly. Eggs and various types of egg sandwiches are common breakfast foods that are served at many such restaurants, where a large volume of such items needs to be prepared relatively quickly, particularly at breakfast. Since a high volume needs to be prepared quickly, labor requirements can be substantial, particularly for the high volume periods of breakfast, lunch, and dinner.

It is desirable to use fresh whole eggs, particularly for sandwiches and food items that require a whole fried egg, for example, such as a fried egg sandwich or an EGG MCMUFFIN® sandwich. Consequently, fresh eggs must be individually cracked, shelled, and cooked. Shelling individual eggs takes time and can be labor intensive if a large quantity of shelled eggs is needed over a relatively short period of time during breakfast, for example. Furthermore, it is not desirable to cook individual whole eggs substantially in advance of serving to customers, as the desirable organoleptic qualities of cooked eggs degrade relatively quickly after cooking. In addition, it would be desirable to separately cook a plurality of individual whole eggs on a single grill surface for substantially the same amount of time to help ensure consistent product quality and uniformity.

Flavor characteristics and taste sensations of breakfast foods and sandwiches are important factors consumers use to evaluate a product. It is important for consumer satisfaction that consumers receive cooked eggs that are of a consistent quality.

In view of the foregoing, there exists a need for a device and method that will allow a plurality of discrete whole eggs to be placed in a segregated manner on a cooking apparatus at substantially the same time. A need further exists for a device and method for reducing the labor intensity required at breakfast for individual shelled eggs while maintaining egg product quality and not requiring that eggs be cooked substantially in advance of serving to customers.

A need further exists for a method of cooking eggs to ensure product uniformity.

SUMMARY OF THE INVENTION

In accordance with the present invention, an uncooked food staging device is provided which contains a plurality of receiving receptacles that are particularly suited for receiving shelled eggs, typically shelled whole eggs or other types of liquid or solid food to be cooked. The staging device may comprise an elongated body having at least one or a plurality of spaced apart single shelled egg receiving receptacles, a separate pour spout associated with each one of the plurality of receptacles, and a handle attached to the elongated body. The pour spout facilitates pouring the food material, such as shelled eggs, from the receiving receptacles.

Typically, the receiving receptacles are arranged in a generally linear array. The receiving receptacles may be generally elliptical, circular, square, diamond or any other geometric or non-geometric shape and arranged on the elongated body such that one side of the receptacle is on one side of the handle and the other side of the receptacle is on the other side of the handle. Preferably, the handle is located in the middle of the width of the elongated body and the elongated body is approximately symmetrical about the middle of the width. In an embodiment with square or diamond shaped receptacles, the corner or point of the geometric shape serves as the spout and there is no need for a separate spout.

In one embodiment, the pour spouts are located on opposite sides of the elongated body. The pour spout may further comprise an upstanding pointed protrusion which can be used to break or pierce an egg yolk, for example.

In a further embodiment, each individual receiving receptacle comprises two pour spouts. The two pour spouts are preferably located on opposite sides of the receiving receptacle.

In a further embodiment, the elongated body comprises square shaped receiving receptacles. The square shaped receiving receptacles are arranged corner-to-corner along a generally linear array.

In accordance with another aspect of the invention, a method for storing shelled eggs for subsequent cooking is provided. A shelled egg staging device comprising an elongated body having a plurality of spaced apart single shelled egg receiving receptacles, a separate pour spout associated with each of the plurality of receptacles, and a handle attached to the elongated body is provided. An egg is shelled and placed into one of the receiving receptacles. This is repeated until each receiving receptacle contains one shelled egg. The eggs are stored in the shelled egg staging device until their use.

The method may further comprise placing the shelled egg staging device containing shelled eggs into refrigerated storage. Typically, a plurality of filled staging devices is placed into a storage compartment.

In accordance with another aspect of the invention, a method of cooking shelled eggs is provided. A shelled egg staging device having shelled eggs in the receptacles is provided. The shelled eggs from the staging device are poured onto an appropriate cooking surface. Typically, the shelled eggs from the staging device are substantially simultaneously poured onto a grill or griddle.

The method may further comprise pouring the shelled eggs or other food from the staging device into egg rings located on a grill surface. The yolk of the eggs may be broken and partially or completely mixed with the egg albumen or whites.

The method may further comprise maintaining the shelled eggs on the cooking surface for a time period sufficient to cook the eggs. The cooked eggs may be removed from the cooking surface as desired and preferably substantially simultaneously using any suitable device. Preferably, an elongated spatula or similar device, having a thin, flat working surface, is utilized to substantially simultaneously remove the eggs from the cooking surface. It is to be understood that any type of food can be substituted for the shelled eggs if desired.

BRIEF DESCRIPTION OF THE FIGURES

The accompanying drawings form part of the specification and like numerals are employed to designate like parts throughout the same.

DETAILED DESCRIPTION OF THE INVENTION

The present invention provides an uncooked food staging device that is particularly suitable for allowing a plurality of shelled eggs to be added to a cooking apparatus, which may be a grill or other cooking surface, at substantially the same time. The uncooked food staging device provides staging for food, such as for a plurality of shelled eggs in individual receptacles that can be substantially simultaneously added to a cooking apparatus for preparing consistently cooked individual eggs substantially simultaneously. By adding individual eggs or other food products to a cooking apparatus substantially simultaneously, it is easier to prepare egg products that are simultaneously cooked for substantially the same amount of time, resulting in more consistently cooked, uniform quality cooked egg products.

The food staging device allows for individual eggs to be shelled, stored, and added to a cooking apparatus. A shelled egg may be any type of egg not contained within a shell, including but not limited to whole eggs, egg yolk, egg albumen or white, pasteurized whole egg products, pasteurized liquid whole egg, pasteurized liquid egg yolk, pasteurized liquid egg white, pasteurized liquid egg substitutes comprising additional ingredients, powdered whole egg comprising water, powdered egg yolk comprising water, powdered egg white comprising water, powdered egg substitutes comprising additional ingredients, other products that have egg as a substantial component and any combination of the foregoing.

Figure 1:
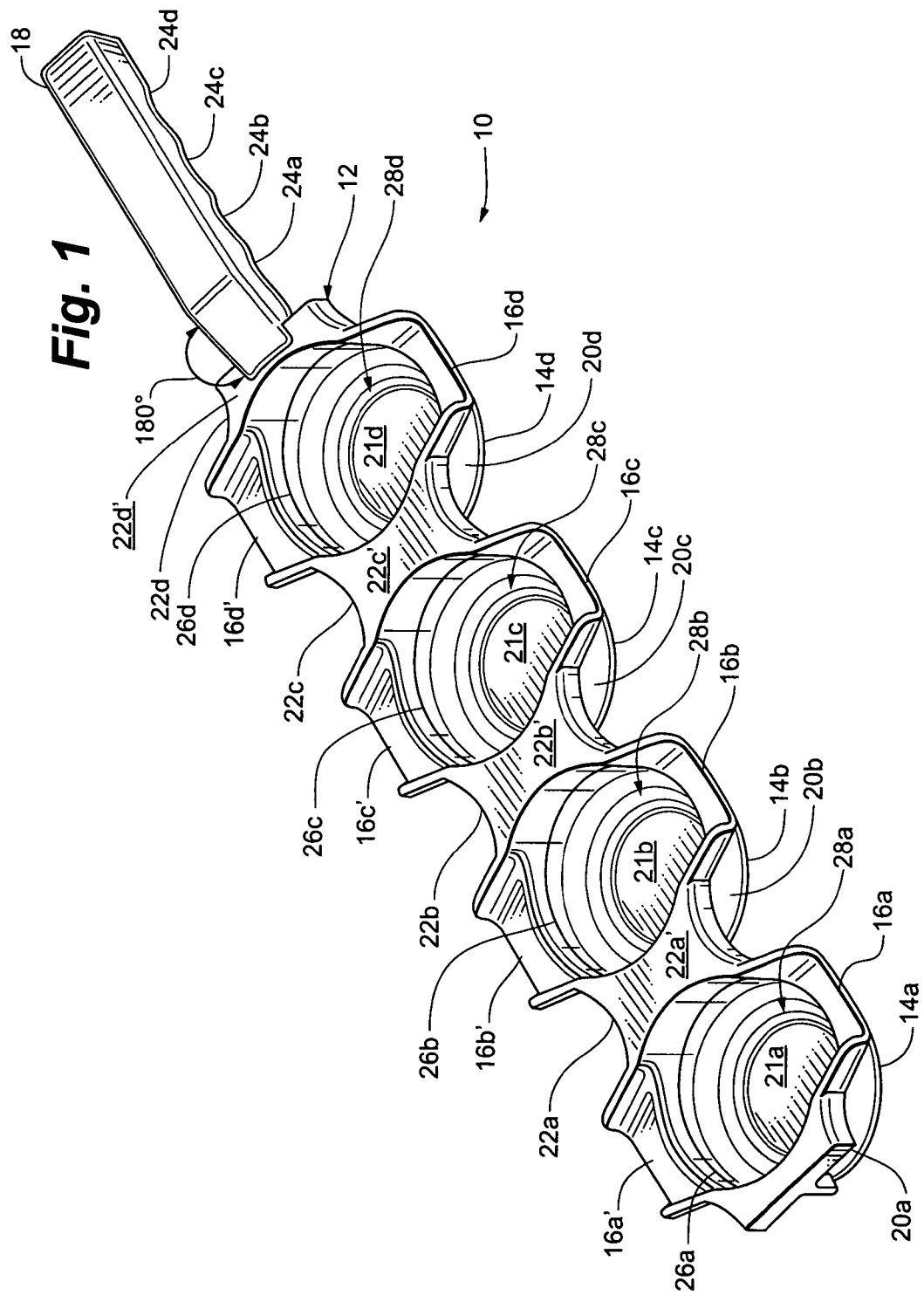
FIG. 1 is a perspective view of an embodiment of a food staging device in accordance with the invention that is particularly suitable for shelled eggs.

Referring to the Figures generally, and in particular to FIG. 1, there is illustrated a view of one embodiment of a shelled egg staging device 10. Shelled egg staging device 10 comprises an elongated body 12, a plurality of individual receiving receptacles 14 *a-d*, separate pour spouts 16 *a-d* and 16 *a'-d'* associated with a respective one of each of receiving receptacles 14 *a-d*, and a handle 18. Receiving receptacles 14 *a-d* comprise a sidewall 20 *a-d* and a bottom 21 *a-d* connected to a respective sidewall 20 *a-d*. Receiving receptacles 14 *a-d* are connected to each other by interconnecting body portions 22 *a-d*, which bridge the distance between each receiving receptacle 14 *a-d* and handle 18. Handle 18 may further comprise finger grips 24 *a-d*. Receiving receptacles 14 *a-d* may further comprise appropriate indicia to indicate how full to fill each receiving receptacle, such as, for example, a shoulder on each receiving receptacle or a fill line 26 *a-d* on the interior of receiving receptacles 14 *a-d*. Additionally, the overall shape of each receiving receptacle may be such that the fill portion is inherent within the receiving receptacle. It is to be understood that shelled egg staging device 10 can be used for other types of food as desired.

As illustrated, there are four individual receiving receptacles 14 *a-d* in the embodiment shown in FIG. 1. Each receiving receptacle 14 *a-d* of FIG. 1 comprises two pour spouts 16 *a-d* and 16 *a'-d'*, on opposite sides of elongated body 12, thus making shelled egg staging device 10 equally well suited for left-handed and right-handed people. If desired, of course, the pour spouts on one side of shelled egg staging device 10, such as pour spouts 16 *a-d* or 16 *a'-d'*, could be eliminated. Also, pour spouts inherent to the receptacle shape can also be provided, as hereafter described with respect to FIG. 3.

It is to be understood that any desired number of receptacles 14 can be provided in a single shelled egg staging device in accordance with the invention, including a single receptacle, 2, 3, 4, 5, 6, 7, or more receptacles.

Advantageously, and as illustrated in FIG. 1, elongated body 12 comprises receiving receptacles 14 *a-d* and interconnecting body portions 22 *a-d* which bridge the distance between receiving receptacles 14 *a-d* and handle 18. Interconnecting body portions 22 a-d comprise top portions 22 *a'-d'*. In an alternate embodiment of the invention, the shelled egg receiving receptacles form the body with no interconnecting body portion, for example, as described hereafter with respect to FIG. 3.

Figure 2:
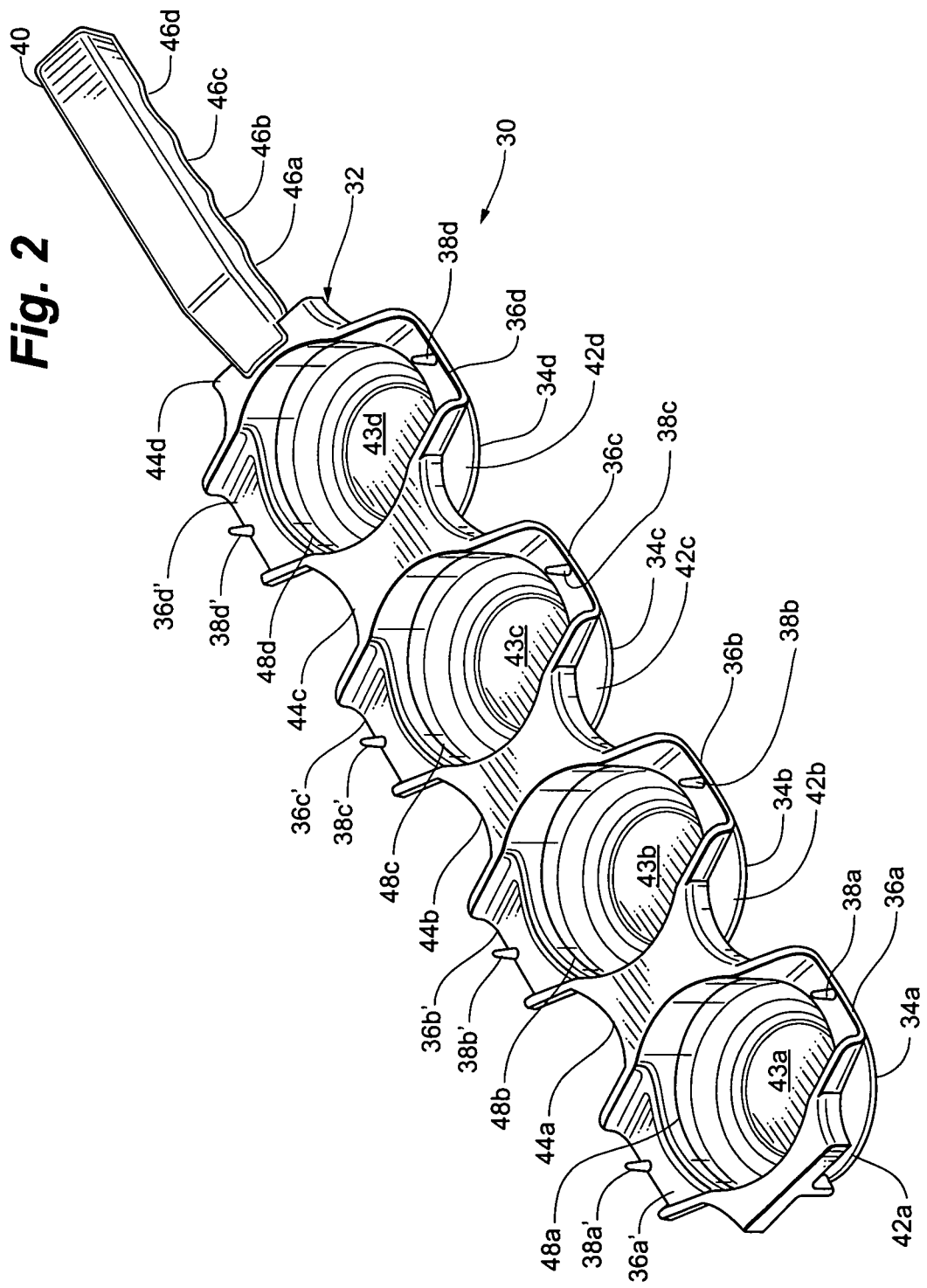
FIG. 2 is a perspective view of another embodiment of the staging device in accordance with the invention.

An alternative embodiment shelled egg staging device 30 is illustrated in FIG. 2 and comprises an elongated body 32, a plurality of individual receiving receptacles 34 *a-d*, separate pour spouts 36 *a-d* and 36 *a'-d'* associated with a respective one of each of receiving receptacles 34 *a-d*, and a handle 40. Receiving receptacles 34 *a-d* comprise a sidewall 42 *a-d* and a bottom 43 *a-d* connected to a respective sidewall 42 *a-d*. Receiving receptacles 34 *a-d* are connected to each other by interconnecting body portions 44 *a-d*, which bridge the distance between receiving receptacles 34 *a-d* and handle 40. Handle 40 may further comprise finger grips 46 *a-d*. Receiving receptacles 34 *a-d* may further comprise appropriate indicia to indicate a fill level for each receiving receptacle, such as, for example, a shoulder on each receiving receptacle or a fill line 48 *a-d* on the interior of receiving receptacles 34 *a-d*. Additionally, the overall shape of each receiving receptacle may be such that the fill portion is inherent as a result of the shape of the receiving receptacle. Thus, if desired, a precise and predetermined amount of egg or other food material can readily be added to each receptacle, thus allowing for a more uniform and consistent product from batch to batch.

As illustrated, there are four individual receiving receptacles 34 *a-d* in the embodiment shown in FIG. 2. Each receiving receptacle 34 *a-d* of FIG. 2 comprises two pour spouts 36 *a-d* and 36 *a'-d'*, on opposite sides of elongated body 32. Shelled egg staging device 30 may contain a pointed protrusion 38 *a-d* and 38 *a'-d'* from each of pour spouts 36 *a-d* and 36 *a'*-d' for breaking, piercing, or puncturing the yolk of the shelled whole egg as it is poured from staging device 30.

Each of pour spouts 36 *a-d* and 36 *a'-d'* may further comprise a pointed protrusion 38 *a-d* and 38 *a'-d'* capable of piercing an egg yolk. Pointed protrusions 38 *a-d* and 38 *a'-d'* comprise a pointed end to facilitate breaking, piercing, or puncturing an egg yolk. Pointed protrusions 38 *a-d* and 38 *a'-d'* may be located at any position on pour spouts 36 *a-d* and 36 *a'-d'*. Typically, pointed protrusions 38 *a-d* and 38 *a'-d'* are located in the center of each pour spout 36 *a-d* and 36 *a'-d'* and extend beyond the periphery of shelled egg staging device 30.

Elongated body 32 comprises a plurality of individual receiving receptacles comprising a center-to-center spacing. The individual receiving receptacles can be arranged in any pattern on the elongated body, including multiple rows with an offset or inline arrangement. Typically, the individual receiving receptacles are arranged in a linear array. It is to be understood that any desired number of receptacles 34 can be provided in a single shelled egg staging device in accordance with the invention, including a single receptacle, 2, 3, 4, 5, 6, 7, or more receptacles. Typically, the elongated body contains at least 3 individual receiving receptacles. Preferably, the elongated body contains 4 individual receiving receptacles.

The individual receiving receptacles may comprise any shape receptacle, including square, elliptical, circular, pentagonal, hexagonal, or any other regular geometric or irregular shape. Typically, the receptacles are substantially circular or square in shape. Typically, square receptacles are arranged point-to-point along the elongated body.

Each individual receiving receptacle 14 *a-d* has an interior 28 *a-d* that may comprise any desired shape, and does not have to be the same shape as the receiving receptacle itself. For example, the inside of each individual receiving receptacle may be square, elliptical, circular, pentagonal, hexagonal, or any other regular geometric or irregular shape. For example, the individual receiving receptacle may be square shaped with a circular interior shape.

The individual receiving receptacles can be any size as desired, and typically will be capable of containing a single or multiple shelled eggs. The receiving receptacles can be from about 1 to 4 inches across at the largest point across the receptacle. Typically, the receiving receptacles are from about 1.25 to about 3.75 inches across. More typically, the receiving receptacles are from about 2.5 to about 3.25 inches across. Preferably, the receiving receptacles are from about 2.65 to about 2.8 inches across for receiving a single shelled whole egg in each receptacle.

Individual receiving receptacles 14 *a-d* further comprise a desired depth. The receiving receptacles may comprise any depth suitable for holding at least one shelled egg. Typically, the receiving receptacles comprise a depth suitable for holding one shelled egg. The depth of the receiving receptacles can be from about 0.5 to about 2.5 inches. Typically, the depth is from about 0.75 to about 2 inches. More typically, the depth is from about 1 to about 1.5 inches. Preferably, the depth is from about 1 to about 1.25 inches.

Individual receiving receptacles 14 *a-d* further comprise a sidewall 20 *a-d* or sidewalls and a bottom. The transition between the sides and the bottom of the receiving receptacles can be any suitable transition. Typically, there is a smooth, rounded transition between the sides and the bottom of the receiving receptacles, as illustrated in FIG. 1.

The shelled egg staging device may further comprise at least one shelled egg contained within at least one receiving receptacle. Typically, when used, a shelled egg staging device of the invention will contain one shelled whole egg in each individual receiving receptacle.

A separate pour spout 16 *a-d* and 16 *a'-d'* may be associated with each individual receiving receptacle 14 *a-d*. Typically, each receiving receptacle comprises at least one pour spout. In one embodiment, as illustrated in FIG. 1, each individual receiving receptacle 14 *a-d* comprises two pour spouts 16 *a-d* and 16 *a'-*d', located on opposite sides of receiving receptacle 14 *a-d*. Pour spouts 16 *a-d* and 16 *a'-*d' can be located at any point along the depth of receiving receptacle 14 *a-d*. Typically, pour spouts 16 *a-d* and 16 *a'-*d' are located at the top of receiving receptacles 14 *a-d* with a smooth rounded transition between each receiving receptacle 14 *a-d* and pour spout 16 *a-d* and 16 *a'-d'*. Shelled egg staging device 10 further comprises center-to-center spout spacing between the spouts of the individual receiving receptacles.

Pour spouts 16 *a-d* and 16 *a'-d'* can be any shape suitable to facilitate pouring a liquid, solid, or mixture thereof. Typically, the pour spout is shaped to facilitate pouring at least one shelled whole egg from receiving receptacles 14 *a-d*. Typically, pour spouts 16 *a-d* and 16 *a'-d'* taper as they extend from sidewalls 20 *a-d* of receiving receptacles 14 *a-d*.

Pour spouts 16 *a-d* and 16 *a'-d'* may extend from receiving receptacles 14 *a-d* any suitable length to facilitate pouring a liquid, solid, or mixture thereof. Typically, pour spouts 16 *a-d* and 16 *a'-d'* extend from about 0.25 to about 1 inch from the side of receiving receptacles 14 *a-d*. Preferably, pour spouts 16 *a-d* and 16 *a'-d'* extend from about 0.45 to about 0.6 inch from the side of receiving receptacles 14 *a-d*.

Figure 3:
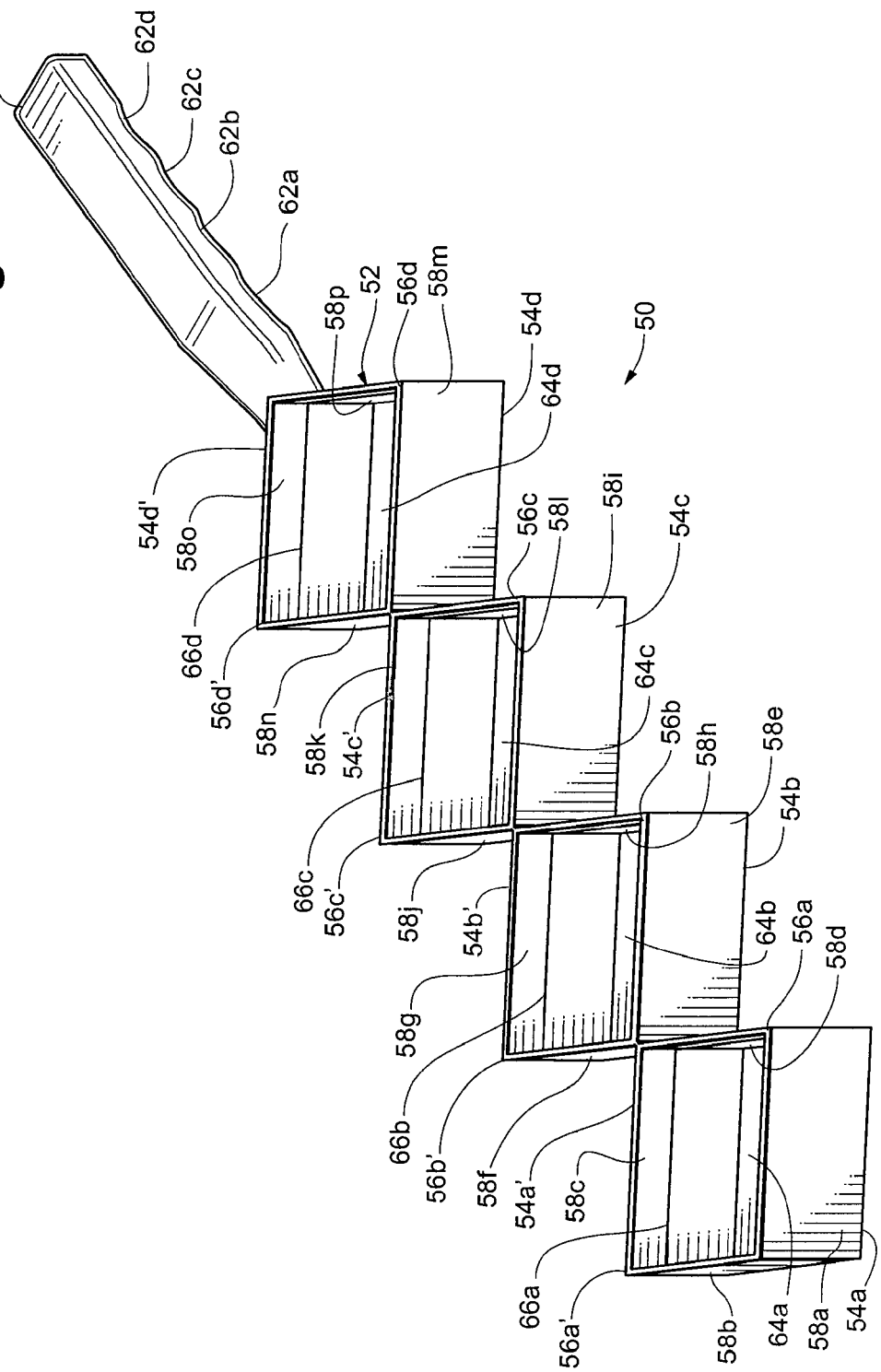
FIG. 3 is a perspective view of another embodiment of the staging device in accordance with the invention.

Some individual receiving receptacles do not require a separate pour spout. An alternative embodiment shelled egg staging device 50 is illustrated in FIG. 3 and comprises an elongated body 52 and a plurality of individual receiving receptacles 54 *a-d*. Receiving receptacles 54 *a-d* comprise top portions 54 *a'-d'* and at least one corner 56 *a-d* and 56 *a'-d'*. Corners 56 *a-d* and 56 *a'-d'* serve as spouts integral to receiving receptacles 54 *a-d*. A separate pour spout is not required. Typically, two corners 56 *a-d* and 56 *a'-d'* are located on opposite sides of receiving receptacles 54 *a-d*. Receiving receptacles 54 *a-d* further comprise sidewalls 58 *a-p*. Shelled egg staging device 50 further comprises a handle 60 which may further comprise finger grips 62 *a-d*. Receiving receptacles 54 *a-d* further comprise a bottom 64 *a-d*, and may further comprise indicia to indicate how full to fill each receiving receptacle, such as, for example, a shoulder on each receiving receptacle or a fill line 66 *a-d* on the interior of receiving receptacles 54 *a-d*. Additionally, the overall shape of each receiving receptacle may be such that the fill portion is inherent within the receiving receptacle.

As illustrated, there are four individual receiving receptacles 54 *a-d* in the embodiment shown in FIG. 3. Each receiving receptacle 54 *a-d* comprises two corners or pour spouts 56 *a-d* and 56 *a'-d'*, on opposite sides of elongated body 52.

Figure 4:
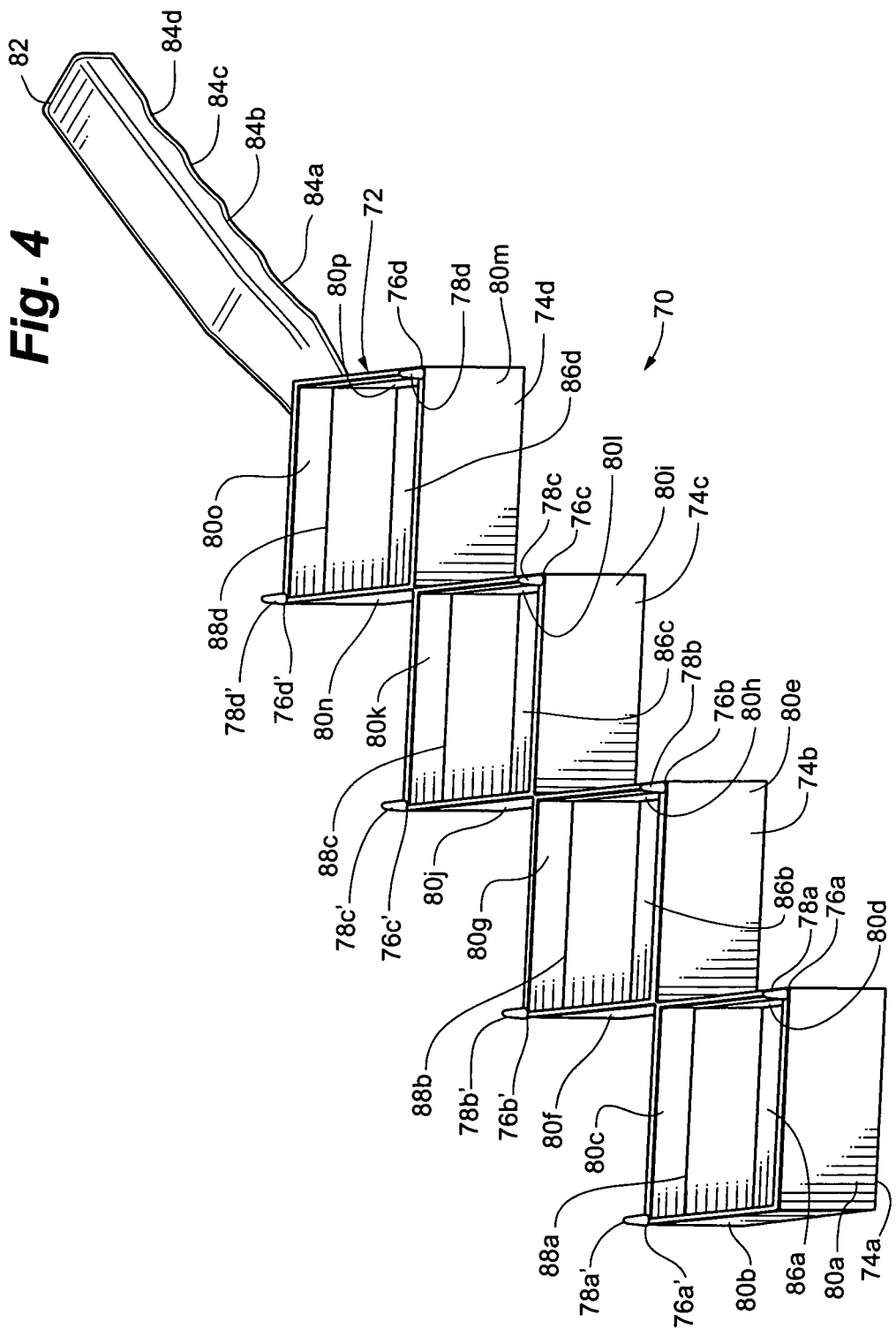
FIG. 4 is a perspective view of another embodiment of the staging device in accordance with the invention.

An alternative embodiment is illustrated in FIG. 4. Shelled egg staging device 70 comprises an elongated body 72 and a plurality of individual receiving receptacles 74 *a-d*. Receiving receptacles 74 *a-d* comprise at least one corner 76 *a-d* and 76 *a'-d'*. Corners 76 *a-d* and 76 *a'-d'* serve as spouts integral to receiving receptacles 74 *a-d*. A separate pour spout is not required. Typically, two corners 76 *a-d* and 76 *a'-d'* are located on opposite sides of receiving receptacles 74 *a-d*. Corners 76 *a-d* and 76 *a'-d'* may comprise a pointed protrusion 78 *a-d* and 78 *a'-d'* from each of corners 76 *a-d* and 76 *a'-d'* for breaking, piercing, or puncturing the yolk of the shelled whole egg as it is poured from shelled egg staging device 70. Receiving receptacles 74 *a-d* further comprise sidewalls 80 *a-p*. Shelled egg staging device 70 further comprises a handle 82 which may further comprise finger grips 84 *a-d*. Receiving receptacles 74 *a-d* further comprise a bottom 86 *a-d*, and may further comprise indicia to indicate how full to fill each receiving receptacle, such as, for example, a shoulder on each receiving receptacle or a fill line 88 *a-d* on the interior of receiving receptacles 74 *a-d*. Additionally, the overall shape of each receiving receptacle may be such that the fill portion is inherent within the receiving receptacle.

As illustrated, there are four individual receiving receptacles 74 *a-d* in the embodiment shown in FIG. 4. Each receiving receptacle 74 *a-d* comprises two corners or pour spouts 76 *a-d* and 76 *a'-d'*, on opposite sides of elongated body 72.

The shelled egg staging device further comprises a handle, such as handles 18, 40, 60, and 82 shown in FIGS. 1-4, respectively. The handle can be any size and shape to facilitate gripping, holding, and rotating the shelled egg staging device. The handle can be positioned at any point along the elongated body. Typically, the handle is located at one end of the width of an elongated body. The handle comprises any suitable length to facilitate gripping the shelled egg staging device by an adult-sized hand. Typically, the handle is from about 4 to about 6 inches long. Preferably, the handle is from about 4.75 to about 5.25 inches long. The handle may be mounted at a substantial angle relative to the body of the shelled egg staging device, such as about 180°, 165°, 150°, or 135° for example, as measured from a line extending along the generally linear array of receiving receptacles of the body and the longitudinal centerline of the handle; and the handle may be in the same or substantially the same plane as a plane extending along the top 22$a'$-$d'$ of interconnecting body portions 22 $a$-$c$ of FIG. 1 or the top 54 $a'$-$d'$ of receptacles 54 $a$-$d$ of FIG. 3, for example. If the handle's angle is substantially less than 180°, it may be desirable to eliminate the pour spouts on one side of the shelled egg staging device.

The handle comprises any width suitable for gripping the shelled egg staging device by an adult-sized hand. Typically, the handle is from about 0.5 to about 1.5 inches wide. Preferably, the handle is from about 0.9 to about 1 inch wide. The handle comprises any height suitable for gripping the shelled egg staging device by an adult-sized hand. Typically, the handle has a height from about 0.5 to about 1.5 inches. Preferably, the handle has a height from about 0.9 to about 1.1 inches.

The handle may further comprise finger grips for ease of use. Typically, the finger grips are located on the bottom of the handle. The finger grips may be any suitable size for an adult-sized hand to grip the handle. The handle may comprise any number of finger grips. Typically, the handle comprises at least four finger grips. Preferably, the handle comprises four finger grips.

Typically, shelled egg staging device 10 is symmetrically formed about the approximate middle of the width of the elongated body 12, comprising a right-handed orientation and a left-handed orientation, as illustrated in FIG. 1. One side of handle 18 is approximately symmetrical and the mirror image of the other side of handle 18. The right-handed orientation allows a right-handed individual to easily use and manipulate shelled egg staging device 10 and the left-handed orientation allows a left-handed individual to easily use and manipulate shelled egg staging device 10.

Figure 5:
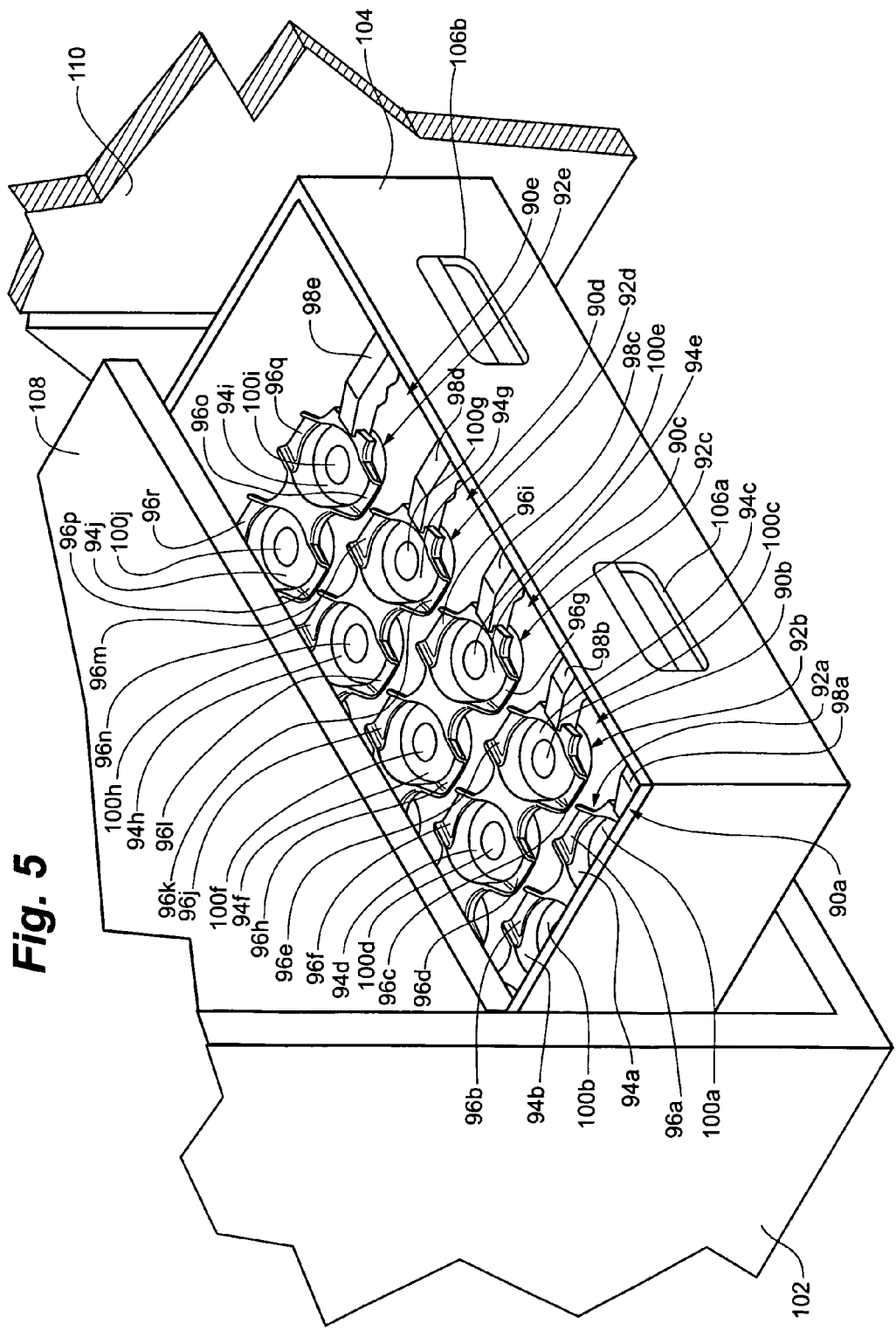
FIG. 5 is a perspective view of a plurality of staging devices of FIG. 1 stored in a refrigerated drawer.

An alternative embodiment of the present invention is illustrated in FIG. 5, illustrating a method for storing shelled eggs. A shelled egg staging device 90 $a$-$e$ comprising an elongated body 92 $a$-$e$ having a plurality of spaced apart single shelled egg receiving receptacles 94 $a$-$j$; a separate pour spout 96 $a$-$r$ associated with each of shelled egg receiving receptacles 94 $a$-$j$; and a handle 98 $a$-$e$ attached to each elongated body 92 $a$-$e$ is provided. At least one egg 100 $a$-$j$ is cracked, shelled and placed into individual shelled egg receiving receptacles 94 $a$-$j$. This is repeated until the desired number of eggs are placed in each shelled egg receiving receptacles 94 $a$-$j$. Typically, one shelled egg 100 $a$-$j$ is placed into each of shelled egg receiving receptacle 94 $a$-$j$. Shelled eggs 100 $a$-$j$ are stored in shelled egg staging devices 90 $a$-$e$ until their use. Typically, filled shelled egg staging devices 90 $a$-$e$ are placed in a refrigerated storage compartment 102. Preferably, a plurality of filled shelled egg staging devices 90 $a$-$e$ are placed into refrigerated storage compartment 102. Refrigerated storage compartment 102 further comprises a drawer 104, handles 106 $a$-$b$ on drawer 104, a shelf 108, and refrigerator door 110. Filled shelled egg staging devices 90 $a$-$e$ are stored in refrigerated storage compartment 102 until cooking.

Any desired storage compartment can be provided for storing shelled egg staging devices in accordance with the invention, including a refrigerator shelf, a refrigerator drawer, a non-refrigerated shelf, and a non-refrigerated drawer.

Figure 6:
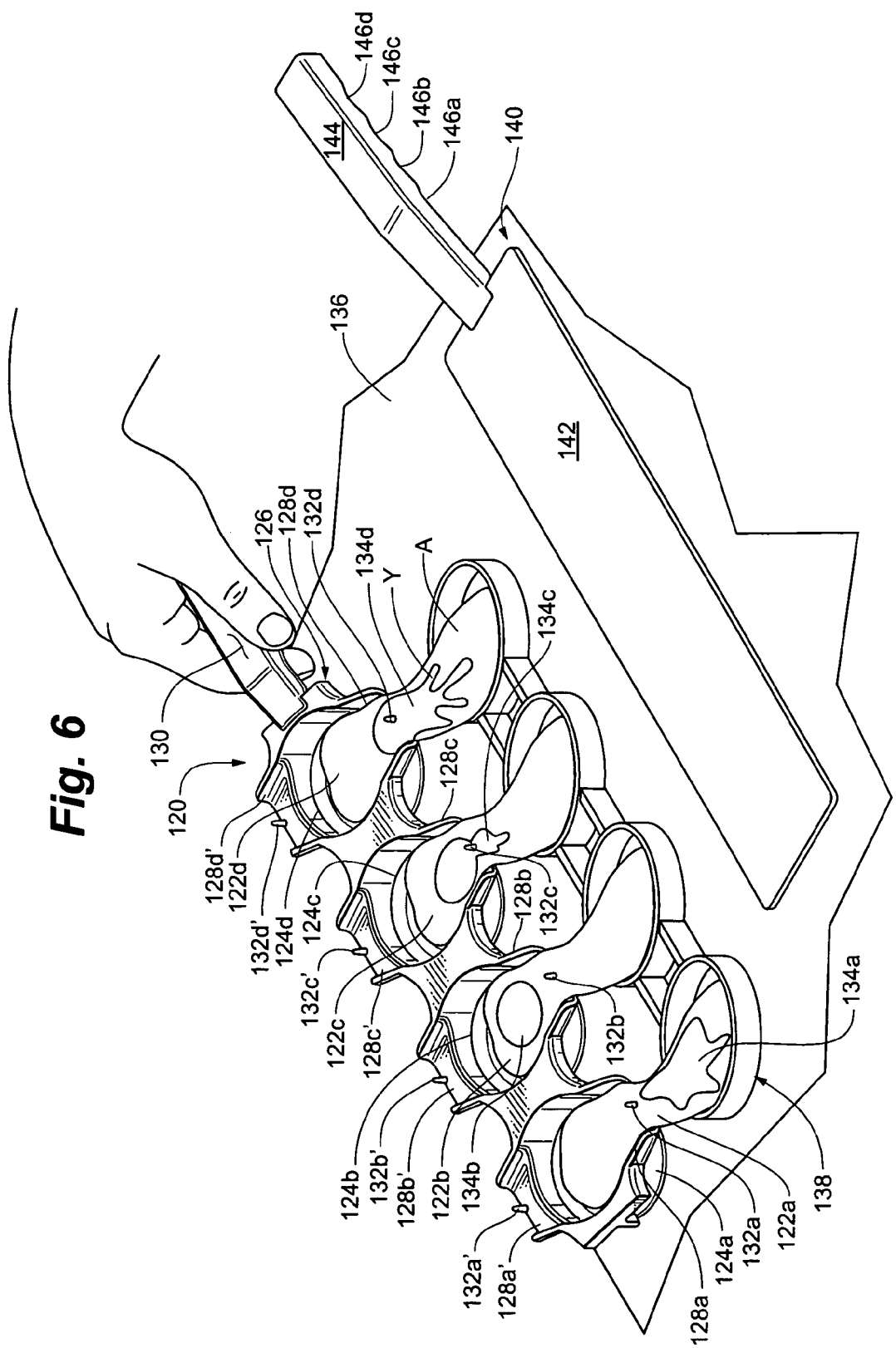
FIG. 6 is a perspective view illustrating a method in accordance with the invention for using the staging device to prepare cooked eggs.

An alternative embodiment of the present invention is illustrated in FIG. 6, illustrating a method for cooking shelled eggs. A shelled egg staging device 120 having shelled eggs 122 $a$-$d$ within receiving receptacles 124 $a$-$d$ is provided. Shelled egg staging device 120 comprises an elongated body 126; receiving receptacles 124 $a$-$d$; separate pour spouts 128 $a$-$d$ and 128 $a'$-$d'$ associated with each of shelled egg receiving receptacles 124 $a$-$d$; and a handle 130 attached to elongated body 126 is provided. Each pour spout 128 $a$-$d$ and 128 $a'$-$d'$ may contain a pointed protrusion 132 $a$-$d$ and 132 $a'$-$d'$ from each of pour spouts 128 $a$-$d$ and 128 $a'$-$d'$ for breaking, piercing, or puncturing a yolk 134 $a$-$d$ of shelled whole egg 122 $a$-$d$ as it is poured from shelled egg staging device 120.

Shelled eggs 122 $a$-$d$ are poured from shelled egg staging device 120 onto a cooking surface 136. Any appropriate cooking surface may be utilized, including a pan, grill, or griddle. Typically, shelled eggs 122 $a$-$d$ are poured from shelled egg staging device 120 onto cooking surface 136 substantially simultaneously. This helps to ensure consistent cooking and uniform quality between multiple eggs cooked at substantially the same time.

The method for cooking shelled eggs further comprises pouring shelled eggs 122 $a$-$d$ from shelled egg staging device 120 into an egg cooking device 138 on cooking surface 136. Shelled eggs 122 $a$-$d$ comprise a yolk Y and an albumen A.

Typically, the egg cooking devices are egg rings suitable for cooking individual eggs on a grill. The egg rings comprise receptacle center-to-center spacing. Typically, the center-to-center spacing of the spouts on the individual receiving receptacles of the shelled egg staging device is approximately the same as the center-to-center spacing of the egg rings. Preferably, the center-to-center spacing of the individual receiving receptacles of the shelled egg staging device is approximately the same as the center-to-center spacing of the egg rings.

The method for cooking shelled eggs may further comprise breaking yolks 134 $a$-$d$ of shelled eggs 122 $a$-$d$ while shelled eggs 122 $a$-$d$ are being poured onto cooking surface 136. Typically, yolks 134 $a$-$d$ are broken using pointed protrusions 132 $a$-$d$ and 132 $a'$-$d'$.

Alternatively, the yolks of the shelled eggs can be broken after the eggs are already on the cooking surface. The yolks can be broken by any desired means capable of breaking a yolk, such as a knife, fork, pin, or any other pointed instrument.

The method for cooking shelled eggs may further comprise maintaining shelled eggs 122 $a$-$d$ on cooking surface 136 for a period of time sufficient to produce cooked eggs. Typically, the cooked eggs from a batch comprising a single shelled egg staging device are removed from the cooking surface substantially simultaneously with an elongated spatula 140. Elongated spatula 140 comprises a spatula surface 142 sufficient to pick up a plurality of cooked eggs, a handle 144, and a plurality of finger grips 146 $a$-$d$. Elongated spatula 140 allows a user to pick up all of the eggs substantially simultaneously by one individual operating elongated spatula 140. This ensures consistent cooking times and a uniform quality product from egg to egg.

EXAMPLE

The invention can be more fully understood by reference to the following example, which is representative of a specific example, but in no way limits the present invention.

A shelled egg staging device comprising an elongated body, four receiving receptacles, two pour spouts on each receiving receptacle oriented on opposite sides of the receiving receptacle, and a handle is provided. One egg was shelled and placed in one receiving receptacle. This was repeated with three additional eggs in the remaining three receiving receptacles, such that each receiving receptacle held one shelled egg when the process was completed.

The shelled egg staging device was placed in a refrigerated storage compartment and stored until needed. When it was necessary to make four cooked eggs, the staging device was removed from the refrigerated storage compartment. The shelled eggs were substantially simultaneously poured from the staging device into individual circular egg rings on a hot grill. The center-to-center spacing of the receiving receptacles is approximately the same as the center-to-center spacing of the egg rings.

The yolks of the eggs were substantially simultaneously broken using the protrusion from the pour spout on the staging device. The eggs were maintained on the grill to allow the eggs to fully cook. Once the eggs were completely cooked, they were substantially simultaneously removed from the grill using an elongated spatula.

The eggs resulting from this process were uniform in shape and each egg was cooked to the same consistency.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A shelled egg staging device comprising:
   a plurality of spaced apart, single, shelled whole raw egg receiving receptacles in a fixed generally linear array;
   a separate pour spout for each of said receptacles, each separate pour spout associated with a different one of said plurality of receptacles, each pour spout having an outlet end, said separate pour spouts being in fixed relation to the receptacles, the outlet ends of the pour spouts being in a fixed generally linear array, and each of said separate pour spouts facing the same direction, to facilitate simultaneous, directed pouring of shelled whole egg from each of the receptacles through the pour spouts into a respective stationary target cooking container, each of said receiving receptacles comprising a fill portion, each said fill portion sized for receiving a shelled whole raw egg, each of said fill portions defining a fill volume with a closed side periphery and closed bottom, the closed side periphery being in fixed relation to the closed bottom, said fill volume disposed below the highest part of the respective pour spout; and
   a handle extending from an end of the generally linear array of receptacles.

2. The shelled egg staging device of claim 1 wherein said receiving receptacles are in a linear array.

3. The shelled egg staging device of claim 2 wherein said linear array of receiving receptacles comprises four receiving receptacles.

4. The shelled egg staging device of claim 1 further comprising one shelled egg within each of said receiving receptacles.

5. The shelled egg staging device of claim 1 wherein said pour spout further comprises an upstanding protrusion, extending upwardly from the bottom of a pour channel defined by said pour spout, for breaking an egg yolk as the egg yolk passes through said channel.

6. The shelled egg staging device of claim 2 wherein said receiving receptacles are generally square in shape, arranged corner-to-corner in a linear array.

7. The shelled egg staging device of claim 1 wherein said receiving receptacles are generally circular and are sufficiently large to contain one shelled whole egg each.

8. The shelled egg staging device of claim 2 wherein said linear array of receptacles is approximately symmetrical about a vertical plane containing an axis of the linear array of receptacles.

9. The shelled egg staging device of claim 1 further comprising two separate pour spouts on opposite sides of said generally linear array of receptacles for each receptacle, each of said two separate pour spouts being associated only with a respective one of said plurality of receptacles.

10. The shelled egg staging device of claim 1, wherein the outlet ends of said separate pour spouts are in a generally horizontal generally linear array when the device is in a horizontal orientation, each of said separate pour spouts defining a channel, a center of the channel of each spout spaced from a center of the channel of each neighboring spout by at least the approximate width of one receptacle.

11. The shelled egg staging device of claim 1, each of said separate pour spouts defining a channel extending away from its respective receptacle, wherein the channel of each of said separate pour spouts tapers to a smaller cross section in a direction extending away from its respective receptacle.

12. The shelled egg staging device of claim 1, each of said separate pour spouts defining a channel, wherein the channel of each of said pour spouts has a width sized to permit passage of a whole egg yolk.

* * * * *